July 1, 1930.    A. M. ROSS    1,768,998
FLUX COATED ELECTRODE
Original Filed April 12, 1927
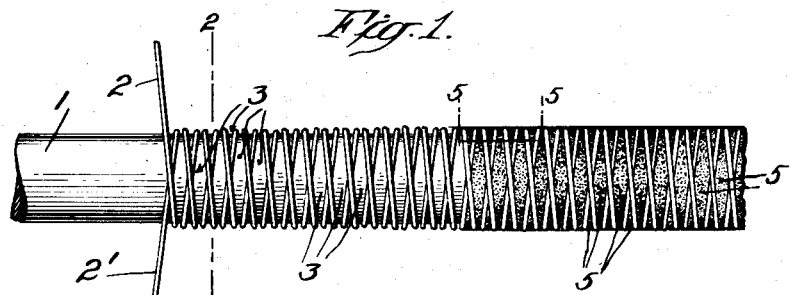
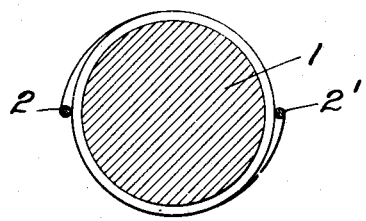
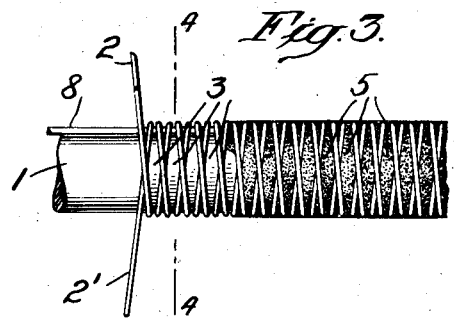
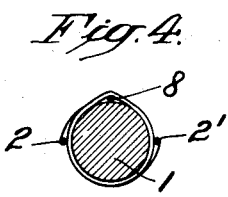
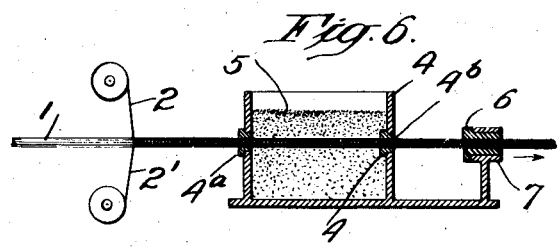
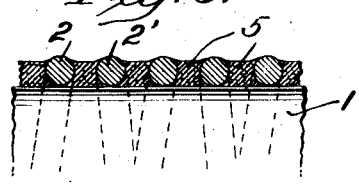
INVENTOR
ALBERT M. ROSS
BY
ATTORNEY Patented July 1, 1930

1,768,998

UNITED STATES PATENT OFFICE

ALBERT M. ROSS, OF JACKSON HEIGHTS, NEW YORK

FLUX-COATED ELECTRODE

Refile of application Serial No. 183,146, filed April 12, 1927. This application filed April 29, 1930. Serial No. 448,402.

This invention relates to flux-coated electrodes and constitutes a refiling of application Serial No. 183,146, filed April 12, 1927.

In the manufacture of electrodes for arc welding it is desirable to coat a metallic core with a welding flux or arc-sustaining material which will assist in the operation of welding, and my invention relates particularly to electrodes of the type in which such a flux is used.

One of the objects of this invention is to provide means whereby this coating of flux on the exterior surface of a core may be retained and to avoid the flaking or chipping off of the flux and particularly to prevent the flux coating from being chipped off during the feeding of the wire in the feeding of the electrode through an automatic welding unit.

Another object of my invention is to produce a wire-wrapped electrode in which the wire will be so arranged and distributed over the circumference of the core and will be so incorporated with the coating thereof as to cause the arc in welding to travel substantially along the axis of the core.

Another object of the invention is to produce an electrode for arc welding on which the flux will be held by an intermeshed or interwoven wire forming a series of wire-separated and interstitial pockets around the circumference, which pockets will be filled with the flux. Preferably the core is wrapped by a pair of wires moving simultaneously in opposite directions to form pockets of diamond shape about this circumference which are subsequently filled in with the flux in paste form and which when dried is keyed on to the surface by said interwoven wires.

Another object of the invention is to produce an electrode which may be fed through feed rollers in automatic machines and may, without chipping or injury be clamped or pinched at any point in its circumference by the conventional feed rollers or electrode holders now employed in automatic arc welding machines.

Still another object of my invention is to provide in combination with an electrode of the type specified, a dioxidizing agent and also one which, upon the crossing of the arc, will melt with the core and will be sufficiently light in relation to the fused welding metal of the core to float to the top of the welded metal so as to form a protecting scale or skin over the deposited material. Such protecting skin or scale will prevent the sticking to the surface of oxides which must either be removed or else will tend to crack any paint applied over it and, in the preferred embodiment, I provide an aluminum wire which provides an aluminum skin over the weld which not only prevents the adherence of oxides but will enable the welded material to take paint readily and evenly without possibility of cracking due to oxidization.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of an electrode wrapped with a plurality of strands of fine wire intermeshing or interwoven with each other to provide an effective flux-retaining element having the members intermeshed or woven;

Fig. 2 is a section on the line 2—2 of Fig. 1;

Fig. 3 is a view similar to Fig. 1, showing the inclusion within the intermeshing or interwoven wire of an anti-dioxidizing element;

Fig. 4 is a section on the line 4—4 of Fig. 3;

Fig. 5 is a fragmentary section on the line 5—5 of Fig. 1; and

Fig. 6 is a diagrammatic view of an electrode being sheathed by intermeshing strands of wire and thereafter coated with flux and wiped.

Referring now to Figs. 1 and 2 which illustrate a preferred embodiment of my invention, 1 indicates a central metallic core which is wrapped by a plurality of intermeshing or interwoven wires and, as shown, I provide a pair 2, 2' of these wires which are caused to intermesh or to be interwoven about the periphery of the central metallic core 1. When two wires are employed, they will cross each other at two points on the peripheral surface or circumference of the said core and will provide between the crossed strands a series of juxtaposed interstitial pockets 3 which, in the form shown, are substantially diamond-shaped in configuration.

This core having said pocketed surface is preferably produced as illustrated in Fig. 6 by simultaneously winding strands 2, 2' of wire about the core 1 preferably while the said core is being moved axially or longitudinally.

The said pocketed core member thus formed is passed through a box 4 containing a flux 5 in paste form. This flux preferably has as a base 70% lime, the balance being made up of conventional dioxidizing agents, the whole being mixed with a suitable binder such as glue, shellac or the like. As illustrated, the wrapped core having such surface pockets is passed through an opening 4ᵃ in one side of the container 4 and out through an opening 4ᵇ in the opposite side, after which it is passed through a wiping element 6 composed of any suitable material mounted in a bearing 7. The passage through the flux 5 in the box 4 causes the pockets to be thoroughly filled with this material and passage thereof through the hub or dye 4ᶜ causes this material to be thoroughly packed into said pockets after which the passage through the wiper 6 will cause any excess material to be wiped from the surface so as to cause the interstitial pockets to be completely filled with the flux material as shown in Fig. 5. The electrode thus produced is dried either in the air or by suitable heating apparatus after which it is cut in lengths or coiled in any suitable manner.

When so dried the flux material will be thoroughly keyed in place and so firmly retained in position that it will not chip or flake either in coiling, shipping or handling and will require no more care in such operation than the ordinary bare electrode wire. Furthermore, the electrode thus produced may be fed through feed rollers in automatic machines and may, without chipping or injury be clamped or pinched at any point in its circumference by the conventional feed rollers or electrode holders now employed in automatic arc welding machines. In applicant's electrode it will be seen that a portion of the intermeshing or interwoven wire will be in continuous contact with the feed roller and will prevent any pressure being applied directly on the interstitial material keyed in, as aforesaid, between the strands of intermeshed or interwoven wire. This material may, after coiling, be straightened and cut for use in hand-welding, if desired, and I have found that the straightening out of the coils of this wire will not cause a flaking or chipping of the flux.

In Figs. 3 and 4 I have shown a modified form of my invention in which I have inserted between the core or base wire 1 and the mesh of wrapping wire a relatively thin aluminum wire 8. In making the electrode shown in Figs. 3 and 4, the wire 8 is strung along with the base wire 1 in any suitable manner and is then wrapped in the manner hereinabove described with the strands 2, 2' of wrapping wire which is thereafter passed through a bath of flux and subsequently wiped in the manner hereinabove described.

In this form of my invention, the aluminum wire 8 comprises a dioxidizing agent and, upon crossing the arc, melts with the core, and because of its high specific gravity, it will flow to the top of the weld metal and will form a thin scale or skin over such deposited welded material, thus protecting the same from the formation of oxides which will be usually found to form on top of the deposited metal and which if not removed will tend to crack paint applied over it. By the use of my dioxidizing agent of high specific gravity, however, the aluminum skin over the weld will have sufficient adherence to produce a surface which will not only be permanently connected to the welding metal, but which because of its property of non-adherence to the oxides, which are usually ferrous oxides, may consequently be brushed off the surface thereof. Paint may, therefore, be readily and evenly applied to this aluminum surface and as this surface is permanent and non-rackable, any paint applied will likewise maintain a smooth non-cracked surface.

Having described my invention, I claim:—

1. An electrode for arc welding comprising a core formed of a fusible metal, a sheathing of intermeshing wire surrounding said metallic core, and a flux composed of arc-sustaining material filling the interstices between said intermeshing wires.

2. An electrode for arc welding comprising a core formed of a fusible metal, a sheathing of intermeshing wire surrounding said metallic core and a flux composed of arc-sustaining material filled into the interstitial pockets between the wires of said sheathing and having a keying connection therewith.

3. An electrode for arc welding comprising a core formed of a fusible metal, a sheathing composed of a mesh of wires formed of two strands wound in opposite directions to provide interstitial pockets substantially diamond shape in conformation and a flux composed of an arc-sustaining material filling said interstitial pockets.

4. An electrode for arc welding comprising a core formed of a fusible metal, a sheathing of intermeshing wire surrounding said metallic core and a flux composed of arc-sustaining material filled into the interstitial pockets between the wires of said sheathing and having a keying connection therewith, said flux material having a surface flush with the surface of said sheathing of intermeshing wire.

5. In an electric arc welding electrode comprising a metallic core having a coating or covering of slag-producing materials, a metallic reinforcement consisting of a woven wire sleeve fitted around the core and embodied in the coating or covering to strengthen the same against breakage and against detachment from the core.

6. In an electric arc welding electrode comprising a metallic core having a coating or covering of slag-producing materials, a metallic reinforcement consisting of stranded wire braided around the core and embodied in the coating or covering to strengthen same against breakage and against detachment from the core.

In witness whereof, I have signed my name to the foregoing specification.

ALBERT M. ROSS.